United States Patent
Hall et al.

(10) Patent No.: US 11,015,103 B2
(45) Date of Patent: May 25, 2021

(54) NANOCELLULOSES AND BIOGUMS FOR VISCOSITY MODIFICATION

(71) Applicant: Halliburton Energy Services, Inc., Houston, TX (US)

(72) Inventors: Lee J. Hall, The Woodlands, TX (US); Orlando Jose Rojas, Apex, SC (US); Carlos Luis Salas Araujo, Raleigh, NC (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 55 days.

(21) Appl. No.: 16/494,090

(22) PCT Filed: May 11, 2017

(86) PCT No.: PCT/US2017/032246
§ 371 (c)(1),
(2) Date: Sep. 13, 2019

(87) PCT Pub. No.: WO2018/208306
PCT Pub. Date: Nov. 15, 2018

(65) Prior Publication Data
US 2020/0131421 A1     Apr. 30, 2020

(51) Int. Cl.
*C09K 8/035*     (2006.01)
*C09K 8/90*      (2006.01)
(Continued)

(52) U.S. Cl.
CPC ............. *C09K 8/035* (2013.01); *C09K 8/905* (2013.01); *E21B 21/062* (2013.01); *E21B 47/00* (2013.01);
(Continued)

(58) Field of Classification Search
None
See application file for complete search history.

(56) References Cited

U.S. PATENT DOCUMENTS 6,348,436 B1 *   2/2002   Langlois ............... B82Y 5/00
                                                  507/112
9,133,384 B2     9/2015   Rincon-Torres et al.
(Continued)

FOREIGN PATENT DOCUMENTS

WO   2016099534   6/2016
WO   2016099537   6/2016
(Continued)

OTHER PUBLICATIONS

ISRWO International Search Report and Written Opinion for PCT/US2017/032246 dated Jan. 26, 2018.
(Continued)

*Primary Examiner* — John J Figueroa
(74) *Attorney, Agent, or Firm* — Tenley Krueger; C. Tumey Law Group PLLC

(57) ABSTRACT

A variety of systems, methods and compositions are disclosed for a treatment fluid comprising a nano-cellulose and a gum. An example method may comprise providing a treatment fluid wherein the treatment fluid comprises: a base fluid; a nano-cellulose; and a gum; and introducing the treatment fluid into a well bore penetrating a subterranean formation.

17 Claims, 2 Drawing Sheets

(51) Int. Cl.
*E21B 21/06* (2006.01)
*E21B 47/00* (2012.01)

(52) U.S. Cl.
CPC ...... *C09K 2208/08* (2013.01); *C09K 2208/10* (2013.01)

(56) References Cited

U.S. PATENT DOCUMENTS

| | | |
|---|---|---|
| 2008/0269079 A1 | 10/2008 | Ballard |
| 2011/0092393 A1 | 4/2011 | Faust, Jr. et al. |
| 2011/0174492 A1 | 7/2011 | Robb et al. |
| 2013/0035263 A1* | 2/2013 | Laukkanen ............... C08L 1/02 507/112 |
| 2013/0274149 A1 | 10/2013 | Lafitte et al. |
| 2014/0037816 A1 | 2/2014 | Bakeev et al. |
| 2015/0072902 A1* | 3/2015 | Lafitte ..................... C09K 8/44 507/112 |
| 2015/0232703 A1* | 8/2015 | Nelson ................. C08L 97/005 435/99 |
| 2015/0368540 A1 | 12/2015 | Monclin et al. |
| 2016/0168443 A1 | 6/2016 | Lafitte et al. |
| 2017/0145285 A1* | 5/2017 | Lafitte ................. C09K 8/5758 |
| 2017/0183554 A1* | 6/2017 | Monclin ................. C09K 8/62 |
| 2017/0210826 A1* | 7/2017 | Nelson ............... C08B 37/0057 |

FOREIGN PATENT DOCUMENTS

| | | |
|---|---|---|
| WO | 2016099841 | 6/2016 |
| WO | 2016187361 | 11/2016 |
| WO | 2016187362 | 11/2016 |
| WO | 2016195506 | 12/2016 |

OTHER PUBLICATIONS

Salas, C.; Nypelo, T.; Rodriguez, C.; Carrillo, C.; Rojas, O.J., "Nanocellulose properties and applications in colloid and Interfaces." Current Opinion in Colloids and Interface Science 2014, 19, 383-396.
Susheel Kalia, et al., Cellulose-Based Bio- and Nanocomposites: A Review, International Journal of Polymer Science, 2011.
Kusanagi, K., Murata, S., Goi, Y., Sabi, M., Zinno, K., Kato, Y., . . . Liang, Y., Application of Cellulose Nanofiber as Environment-Friendly Polymer for Oil Development. 2015, SPE/IATMI Asia Pacific Oil & Gas Conference and Exhibition. SPE-176456-MS.

* cited by examiner

NANOCELLULOSES AND BIOGUMS FOR VISCOSITY MODIFICATION

BACKGROUND

During the drilling of a wellbore into a subterranean formation, a drilling fluid, also referred to as a drilling mud, may be continuously circulated from the surface down to the bottom of the wellbore being drilled and back to the surface again. Among other functions, the drilling fluid may serve to transport wellbore cuttings up to the surface, cool the drill bit, and provide hydrostatic pressure on the walls of the drilled wellbore. Oftentimes the rheology of the drilling fluid must be adjusted by addition of one or more rheology modifiers in order to meet the engineering requirements of the fluid. One particular engineering requirement may be viscosity.

Viscosity may be an important parameter of drilling fluids as it may be one of the main factors that affects the transport ability of the drilling fluid. A drilling fluid must be able to transport cuttings away from the drill bit and out of the wellbore or the cuttings may accumulate in the wellbore causing reduced penetration rate and in extreme cases, complete cessation of the drilling operation.

Previous methods controlling viscosity have involved adding viscosity modifying agents to a drilling fluid. The viscosity modifying agents typically must be added in relatively large amounts to affect the apparent viscosity. The large amounts of viscosity additives may lead to adverse effects other than the intended viscosity increase.

BRIEF DESCRIPTION OF THE DRAWINGS

These drawings illustrate certain aspects of some examples of the present invention, and should not be used to limit or define the invention.

DETAILED DESCRIPTION

Figure 1:
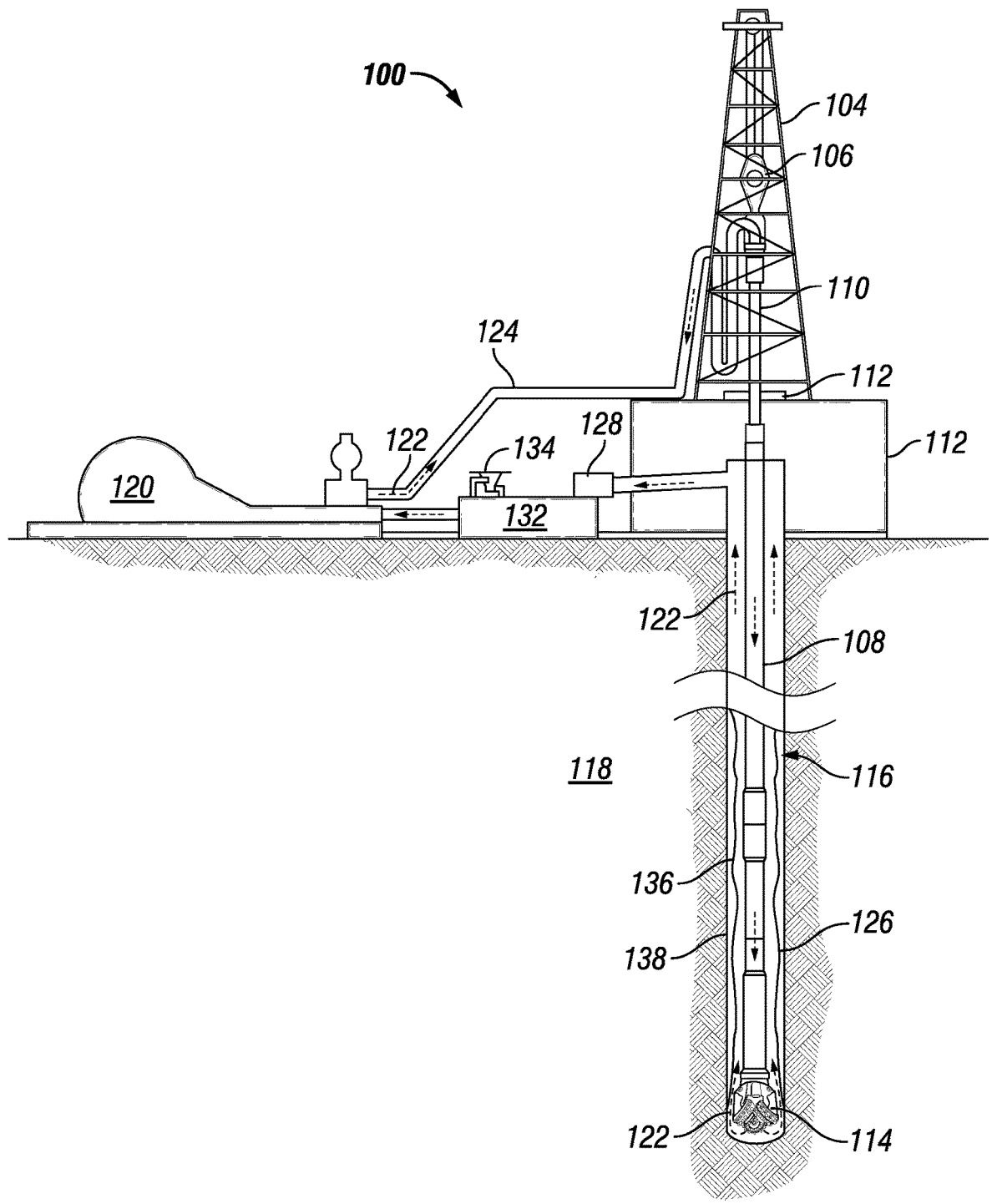
FIG. 1 is a schematic diagram of an example drilling assembly.

Provided are compositions, methods, and systems for well treatment. More particularly, the present disclosure relates to compositions, methods, and systems of treatment fluids, such as drilling and completion fluids, comprising nano-cellulose and a gum. A drilling or completion fluid may comprise water, nano-cellulose, and a gum. The term "nano-cellulose" as used herein refers to cellulose having a width or thickness less than 100 nanometers. Advantageously, a treatment fluid comprising nano-cellulose and gum may exhibit unusual properties such as an increase or decrease in viscosity depending on the type and amount of gum present. Surprisingly, the amount of gum required to change the viscosity may be relatively small compared to other additives for changing viscosity as will be highlighted in greater detail in the examples below.

Where used, water included in the treatment fluid may be from any suitable source. By way of example, the water may be sourced from freshwater, saltwater, and produced water, among others. Water may be used, for example, as the base fluid in an aqueous-based fluid or the discontinuous phase in oil-based or synthetic-based treatment fluids in the form of an invert emulsion. The water may be included in the treatment fluid in any suitable amount for a particular application as desired by one of ordinary skill in the art.

The treatment fluid may comprise nano-cellulose. Nano-cellulose may comprise nano-fibril cellulose or cellulose nanocrystals. The term "nano-fibril cellulose" or "NFC" generally refers to cellulose comprising nanofibrils, whether isolated nanofibrils or bundles of nanofibrils, derived from a cellulose raw material. NFC may comprise long thin fibers which form a three-dimensional network. NFC may comprise fibers of crystalline and amorphous regions.

NFC may be described as long and flexible cellulose nanofibrils and may be obtained from cellulose fiber by mechanical disintegration, for example. Dimensions for NFC may include nanofibrils with a high aspect ratio. The NFC may include individual nanofibrils having lengths in a range from about 100 nm to about 3000 nm or even longer. The NFC may include individual nanofibrils having diameters of about 100 nm or less, about 500 nm or less, about 100 nm or less, or about 20 nm or less. By way of example, the NFC may include individual nanofibrils having lengths of about 500 nm or greater and diameters of about 100 nm or less.

NFC may be manufactured from a number of different cellulosic sources. The cellulosic fibers of NFC may be derived from wood, bleached or unbleached kraft pulp, bleached or unbleached sulfite pulp, mechanical pulp, thermomechanical pulp, thermomechanical pulp, chemi-thermo-mechanical pulp, bacteria, sugar beet pulp, wheat straw, soy hulls, sisal, bagasse, empty fruit palm bunches, ramie, carrots, luffa cylindrical, or any combination thereof. A variety of mechanical defibrillation methods may be used, including high-pressure homogenization, grinding, ultra-sonication, cryocrushing and high-speed blending. NFC may display a high surface area, generally of the order of 50-70 $m^2/g$ which may increase the quantity of surface hydroxyl groups available for surfactant adsorption. In some instances, the NFC may be surface treated with a surfactant.

The surfactant used in treatment of the NFC may be zwitterionic, cationic, anionic, nonionic, or amphoteric in nature, and comprise any number of different compounds, including methyl ester sulfonates, betaines, modified betaines, sulfosuccinates, taurates, amine oxides, ethoxylated fatty amines, quaternary ammonium compounds, alcohol ether sulfates, alkyl sulfates, aryl sulfonates, alkyl sulfonates, derivatives thereof, and combinations thereof. The term "derivative" is defined herein to include any compound that is made from one of the listed compounds, for example, by replacing one atom in one of the listed compounds with another atom or group of atoms, ionizing one of the listed compounds, or creating a salt of one of the listed compounds.

Cellulose nanocrystals may comprise a highly crystalline structure. Cellulose nanocrystals may be produced by treating cellulose with sulfuric acid to hydrolyze the amorphous regions. The resultant crystals may be separated and further processed and refined. Cellulose nanocrystals may comprise any suitable size from about 2 nm to about 100 nm.

The nano-cellulose in the form of nano-fibril or cellulose nanocrystals may be present in the treatment fluid in any concentration, including, but not limited to, in a range of from about 0.01 wt. % to about 1 wt. % based on a total weight of the treatment fluid. Alternatively, a concentration in a range of from about 0.01 wt. % to about 0.1 wt. %, a range of from about 0.1 wt. % to about 0.2 wt. %, a range of from about 0.2 wt. % to about 0.3 wt. %, a range of from about 0.3 wt. % to about 0.4 wt. %, a range of from about 0.4 wt. % to about 0.5 wt. %, a range of from about 0.5 wt. % to about 0.6 wt. %, a range of from about 0.6 wt. % to about 0.7 wt. %, a range of from about 0.7 wt. % to about 0.8 wt. %, a range of from about 0.8 wt. % to about 0.9 wt. %, a range of from about 0.9 wt. % to about 1 wt. %, a range of from about 0.1 wt. % to about 0.5 wt. %, or a range of from about 0.5 wt. % to about 1 wt. %.

The treatment fluid may comprise a gum. Gums are hydrocolloid polymers, generally of plant, microbial, or synthetic origin, that may be gelatinous, including, but not limited to, polysaccharides. Gums may be characterized by forming viscous, colloidal dispersions (or gels) in water. Gums may be provided in any suitable form, including, but not limited, powders, emulsions, or concentrated gels. Some gums may be salts of complex organic acids. The gums may comprise a biopolymer and may be from any source including those obtained by chemical derivatization of biological starting materials (e.g. hydroxyethylated, hydroxypropylated, carboxymethylated and/or carboxymethylated hydroxyethylated derivatives of such biopolymers). Non-limiting examples of suitable biopolymers include starches, celluloses, chitosans, and derivatized polysaccharides such as hydroxyethyl cellulose (HEC), carboxymethyl cellulose, and carboxymethylhydroxyethyl cellulose. Other suitable gums may include, but are not limited to, agar, alginic acid, beta-glucan, carrageenan, chicle gum, dammar gum, gellan gum, guar gum, gum arabic, gum ghatti, gum tragachanth, karava gum, locust bean gum, mastic gum, *psyllium* seed husks, sodium alginate, spruce gum, tara gum, xanthan gum, whelan gum, or combinations thereof. Non-limiting examples of gum derivatives suitable for use in this disclosure include hydroxypropyl guar, and caboxymethyl hydroxypropyl guar. Suitable bacterial gums include, but are not limited to, diutan and xanthan. The gums may be classified according to their surface charge such as non-ionic, cationic, and anionic. Examples of anionic gums may include xanthan gum and welan gum. Non-ionic gums may include guar gum and locust bean gum. One of ordinary skill in the art with the benefit of this disclosure should recognize if a certain gum is non-ionic, cationic, or anionic.

The gum or combination or gums may be present in the treatment fluid in any concentration, including, but not limited to, a range of from of about 0.01% wt. % to about 1 wt. % based on a total weight of the treatment fluid. Alternatively, in a concentration in a range of from about 0.01 wt. % to about 0.1 wt. %, a range of from about 0.1 wt. % to about 0.2 wt. %, a range of from about 0.2 wt. % to about 0.3 wt. %, a range of from about 0.3 wt. % to about 0.4 wt. %, a range of from about 0.4 wt. % to about 0.5 wt. %, a range of from about 0.5 wt. % to about 0.6 wt. %, a range of from about 0.6 wt. % to about 0.7 wt. %, a range of from about 0.7 wt. % to about 0.8 wt. %, a range of from about 0.8 wt. % to about 0.9 wt. %, a range of from about 0.9 wt. % to about 1 wt. %, a range of from about 0.1 wt. %/o to about 0.5 wt. %, or range of from about 0.5 wt. % to about 1 wt. %.

One or more dissolved salts may also be present in the treatment fluids. Where used, the dissolved salt may be included in the treatment fluid for many purposes, including, but not limited to, densifying a treatment fluid including water to a chosen density. A mixture of one or more dissolved salts and water may be used in some instances. The amount of salt that should be added may be the amount needed to provide a desired density. By way of example, the salt may be used to density water and provide a treatment fluid having a density ranging from about 8.5 lb/gal to about 20 lb/gal or even greater. In some embodiments, one or more salts may be added to the water to provide a brine that includes the dissolved salt and the water. Suitable dissolved salts may include monovalent and divalent salts. Mixtures of monovalent and divalent salts may also be used. Suitable monovalent salts may include, but are not limited to, sodium chloride, sodium bromide, potassium bromide, potassium chloride, potassium formate cesium formate, potassium formate, and mixtures thereof among others. Suitable divalent salts may include, but are not limited to, calcium bromide, zinc bromide, calcium chloride, and mixtures thereof.

A wide variety of optional additives may be included in the treatment fluid as should be appreciated by those of ordinary skill in the art with the benefit of this disclosure. Suitable additives may include, but are not limited to, a surfactant (e.g., foamer, defoamer, wetting agent, detergent, lubricant, and corrosion inhibitor), a water softener (e.g., sodium carbonate), an oxygen scavenger, a biocide, pH adjusters, fluid loss control agents, viscosity increasing agents, weighting agents (other than salt) and a corrosion inhibitor (other than surfactant).

Weighting agents may also be included in the treatment fluids. The term weighting agents refers to particulate materials present in the treatment fluid that weigh more than water and may be used to increase the density of drilling fluids. By way of example, weighting agents may have a specific gravity of about 2 or higher (e.g., about 2, about 4, etc.). Suitable weighting agents may include, but are not limited to, hematite, illmenite, hausmannite, barite, and combinations thereof. Specific examples of suitable weighting agents include HI-DENSE® weighting agent, available from Halliburton Energy Services, Inc.

The treatment fluids may have any suitable density for a particular application. Suitable densities may include, but are not limited to, a density ranging from about 8 pounds per gallon (1 kg/L) to about 20 pounds per gallon (2.4 kg/L) or from about 12 pounds per gallon (1.4 kg/L) to about 20 pounds per gallon (2.4 kg/L). Those of ordinary skill in the art, with the benefit of this disclosure, should to select a density of the treatment fluid for a particular application.

The treatment fluids may have any suitable viscosity for a particular application. A treatment fluid may comprise a viscosity of about 200 cP to about 2000 cP at a shear rate of 5.1 s$^{-1}$ and about 5 cP to about 100 cP at a shear rate of 1021 s$^{-1}$. Alternatively, about 200 cP to about 500 cP at a shear rate of 5.1 s$^{-1}$, about 500 cP to about 1000 cP at a shear rate of 5.1 s$^{-1}$, about 1000 cP to about 1500 cP at a shear rate of 5.1 s$^{-1}$, or about 1500 cP to about 2000 cP at a shear rate of 5.1 s$^{-1}$. Alternatively, about 5 cP to about 20 cP at a shear rate of 1021 s$^{-1}$, about 20 cP to about 50 cP at a shear rate of 1021 s$^{-1}$, about 50 cP to about 70 cP at a shear rate of 1021 s$^{-1}$, or about 70 cP to about 100 cP at a shear rate of 1021 s$^{-1}$. In use of the fluids described herein, the fluid may comprise a target or predetermined viscosity. The predetermined viscosity may be any viscosity listed above.

In general, the required viscosity of the treatment fluid is predetermined during the planning of the well. A drilling operation may require multiple viscosities of fluid for different zones or times during drilling. Additionally, an operator may determine that a fluid viscosity should be changed on-the-fly to another predetermined value. The drilling fluids of the present disclosure may be advantageous as viscosity can be changed on the fly with relatively small amounts of gum as will be illustrated in later examples. The small amounts of gum required to effect the viscosity may be provide lower cost treatment fluids as the total amount of materials required to ship and mix may be reduced.

The treatment fluids may be prepared using any suitable method and/or equipment (e.g., blenders, mixers, stirrers, etc.). The treatment fluids may be prepared at least in part at a well site, at an offsite location, or a combination thereof.

In certain instances, nano-cellulose and gum may be metered directly into a base fluid (e.g., a base fluid including water, such as a brine) to form the treatment fluid. In certain embodiments, other treatment fluid components may be mixed with the base fluid at a well site where the drilling operation is conducted, either by batch or continuous mixing. In certain embodiments, the treatment fluids may be prepared, either in whole or part, at an offsite location and transported to the site where the drilling operation is to be conducted.

A treatment fluid comprising nano-cellulose and gum may exhibit unusual properties such as an increase or decrease in viscosity depending on the type and amount of gum present. Surprisingly, the amount of gum required to change the viscosity may be relatively small compared to other additives for changing viscosity as will be highlighted in greater detail in the examples below. It was observed that the addition of small amounts of anionic gum such as xanthan gum to a fluid containing nano-cellulose caused the observed viscosity to increase. Further, it was observed that a fluid containing nano-cellulose and small amounts of a non-ionic gum such as guar gum caused a decrease in the observed viscosity.

A method of using the treatment fluid comprising the nanocellulose and gum may comprise monitoring the viscosity of a drilling fluid and adding additional gum to increase or decrease the viscosity as needed. A viscosity may be monitored at any point in the drilling operation. For example, the drilling fluid viscosity may be measured at the circulation system of a drilling operation. A drilling operation typically re-uses a drilling fluid by circulating the fluid through the drill string and drill bit, up the annulus, and to the surface to be cleaned before being re-introduced into the drill string. A circulation system typically comprises fluid pumps, mud gas separators, shale shakers, degassers, desanders, mud cleaners, mud agitators, mud tanks, mud mixing hopper, mud mixing pumps, mud discharge lines, mud return lines, mud pits, and other areas where the drilling fluid or "mud" may be transported or be stored. The viscosity may be monitored at any point but it may be particularly advantageous to measure a viscosity during the mixing of the drilling fluid before re-introduction into the wellbore.

As previously discussed, viscosity may be an important characteristic of the drilling fluid as it may determine the solids transport ability of the drilling fluid. If the measured viscosity of the drilling fluid is too low the fluid may not have the ability to transport cuttings and the drilling operation may cease. Alternatively, if the viscosity is too high, there may be too much resistance to flow and the horsepower required to overcome the friction of the fluid may become increasingly large. Therefore, the ability to quickly and efficiently control the viscosity of the drilling fluid may be important to a drilling operation.

If the measured viscosity of the drilling fluid is too low, an anionic gum may be added to the drilling fluid to increase the viscosity. The anionic gum may be added to increase the concentration of the anionic gum to range from about 0.01 wt. % to about 1 wt. % based on a total weight of the drilling fluid. Alternatively, a concentration in a range of from about 0.01 wt. % to about 0.1 wt. %, a range of from about 0.1 wt. % to about 0.2 wt. %, a range of from about 0.2 wt. % to about 0.3 wt. %, a range of from about 0.3 wt. % to about 0.4 wt. %, a range of from about 0.4 wt. % to about 0.5 wt. %, a range of from about 0.5 wt. % to about 0.6 wt. %, a range of from about 0.6 wt. % to about 0.7 wt. %, a range of from about 0.7 wt. % to about 0.8 wt. %, a range of from about 0.8 wt. % to about 0.9 wt. %, a range of from about 0.9% wt. to about 1 wt. %, a range of from about 0.1 wt. % to about 0.5 wt. %, or range of from about 0.5 wt. % to about 1 wt. %. Alternatively, if the measured viscosity of the drilling fluid is too high, a non-ionic gum may be added to decrease the viscosity of the drilling fluid. The non-ionic gum may be added to increase the concentration of the non-ionic gum to a range from about 0.01 wt. % to about 1 wt. % based on a total weight of the drilling fluid. Alternatively, a concentration in a range of from about 0.01 wt. % to about 0.1 wt. %, a range of from about 0.1 wt. % to about 0.2 wt. %, a range of from about 0.2 wt. % to about 0.3 wt. %, a range of from about 0.3 wt. % to about 0.4 wt. %, a range of from about 0.4 wt. % to about 0.5 wt. %, a range of from about 0.5 wt. % to about 0.6 wt. %, a range of from about 0.6 wt. % to about 0.7 wt. %, a range of from about 0.7 wt. % to about 0.8 wt. %, a range of from about 0.8 wt. % to about 0.9 wt. %, a range of from about 0.9% wt. to about 1 wt. %, a range of from about 0.1 wt. % to about 0.5 wt. %, or range of from about 0.5 wt. % to about 1 wt. %.

In addition to the viscosity, the gum concentration may be monitored in the drilling fluid. In addition to providing viscosity control, gums may also provide fluid loss control. Fluid loss control may be described as controlling the volume of a filtrate that passes through a filter medium. In the instance of a drilling fluid, the filter medium is the filter cake that builds up on the interior of the wellbore during drilling operations and the filtrate is the drilling fluid itself. Gums may act as fluid loss control agents by decreasing the amount of fluid lost through the filter cake. Monitoring the concentration of the gum present in the drilling fluid may allow control over the fluid loss properties of the drilling fluid. The gums disclosed herein typically decrease the amount of fluid lost with increasing concentration of gum.

A method may further comprise equipment for viscosity or gum concentration such as measurement tool for detecting concentrations of gum or a viscosity tool for measuring viscosity. A method may further comprise equipment for delivering a measured amount of gum into the drilling fluid, and equipment for mixing the gum and drilling fluid. Gums may be provided as a dry powder or as a liquid additive. In the instance of a where the gum is provided as a liquid additive, liquid additive pumps may provide a measured amount of liquid additive gum to a mixing unit wherein the liquid additive gum and drilling fluid are mixed. In the instance of where the gum is provided as a dry powder, any conveyance means suitable for measuring and moving dry powder may be used to deliver the gum to a mixing unit. Without limitation, the conveyance means may be pneumatic or mechanical. A mechanical system may comprise a screw type mechanism or other powder transport systems well known in the art.

In addition to gum concentration and viscosity monitoring, the concentration of nano-cellulose may also be monitored. If the concentration of nano-cellulose drops below a predetermined concentration, additional nano-cellulose may be added to the drilling fluid. In the instance where the concentration of nano-cellulose is higher than a predetermined concentration, additional nano-cellulose free drilling fluid may be provided to mix with the drilling fluid comprising the higher than predetermined concentration of nano-cellulose. The nano-cellulose may be provided as a dry powder, gel additive, or as a liquid additive. In the instance of a where the nano-cellulose is provided as a gel additive, the nano-cellulose may be a solid network holding an aqueous phase. In the instance of where the nano-cellulose is provided as a liquid additive, liquid additive pumps may provide a measured amount of liquid additive nano-cellulose to a mixing unit wherein the liquid additive nano-cellulose and drilling fluid are mixed. In the instance of where the nano-cellulose is provided as a dry powder, any conveyance means suitable for measuring and moving dry powder may be used to deliver the gum to a mixing unit. Without limitation, the conveyance means may be pneumatic or mechanical. A mechanical system may comprise a screw type mechanism or other powder transport systems well known in the art.

Accordingly, this disclosure describes systems, compositions, and methods relating to delayed release of a resin curing agent. Without limitation, the systems, compositions and methods may further be characterized by one or more of the following statements:

Statement 1. A method for well treatment comprising: providing a treatment fluid wherein the treatment fluid comprises: a base fluid; a nano-cellulose; and a gum; and introducing the treatment fluid into a well bore penetrating a subterranean formation.

Statement 2. The method of statement 1, wherein the treatment fluid is a drilling fluid or a completion fluid.

Statement 3. The method of statement 1, wherein the base fluid comprises water.

Statement 4. The method of statement 1, wherein the nano-cellulose comprises at least one cellulose selected from nano-fibril cellulose, cellulose nanocrystals, and combinations thereof.

Statement 5. The method of statement 1, wherein the gum comprises at least one biopolymer selected from guar gum, locust bean gum, welan gum, xanthan gum, and combinations thereof.

Statement 6. The method of statement 1, wherein the nano-cellulose is present in a concentration in a range of from about 0.01 wt. % to about 1 wt. % based on the total weight of the treatment fluid.

Statement 7. The method of statement 1, wherein the gum is present in a concentration in a range of from about 0.01 wt. % to about 1 wt. % based on the total weight of the treatment fluid.

Statement 8. The method of statement 1, further comprising: circulating the treatment fluid through a drill string, through a drill bit, and back above-surface through an annulus between the drill string and a wall of the well bore; measuring a viscosity of the treatment fluid; and adding additional gum, nano-cellulose, or both to the treatment fluid.

Statement 9. The method of statement 8, wherein the additional gum added is anionic if the measured viscosity is below a predetermined viscosity.

Statement 10. The method of statement 8 wherein the additional gum added is nonionic if the measured viscosity is above a predetermined viscosity.

Statement 11. A method for adjusting a viscosity of a drilling fluid comprising: providing the drilling fluid comprising: water; nano-fibril cellulose; and a gum; circulating the drilling fluid through a drill string, through a drill bit, and back above-surface through an annulus between the drill string and a wall of a wellbore; measuring a viscosity of the drilling fluid; determining an amount of additional gum to add to the drilling fluid to produce a drilling fluid with a predetermined viscosity; and re-circulating the drilling fluid though the drill string, though the drill bit, and back above-surface though the annulus between the drill string and the wall of the wellbore.

Statement 12. The method of statement 11, wherein the gum comprises at least one biopolymer selected from guar gum, locust bean gum, welan gum, xanthan gum, and combinations thereof.

Statement 13. The method of statement 11, wherein the gum is present in a concentration in a range of from about 0.01 wt. % to about 1 wt. % based on the total weight of the drilling fluid.

Statement 14. The method of statement 11, wherein the nano-fibril cellulose is present in a concentration in a range of from about 0.01 wt. % to about 1 wt. % based on the total weight of the drilling fluid.

Statement 15. The method of statement 11, wherein the additional gum added is anionic if the measured viscosity is below the predetermined viscosity.

Statement 16. The method of statement 11, wherein the additional gum added is nonionic if the measured viscosity is above a predetermined viscosity.

Statement 17. The method of statement 11, wherein the viscosity is measured before, during, and/or after circulation of the drilling fluid.

Statement 18. The method of statement 11, wherein the additional gum is added in a mixing tank, and wherein the drilling fluid is circulated by a pump.

Statement 19. The method of statement 11, further comprising measuring filtration control properties before, during, and/or after circulation of the drilling fluid.

Statement 20. The method of statement 11, wherein the measuring the viscosity comprises measuring the viscosity of the drilling fluid after the step of circulating, wherein the gum and the additional gum are the same and each comprise at least one biopolymer selected from guar gum, locust bean gum, welan gum, xanthan gum, and combinations thereof, and wherein the drilling fluid is a water-based drilling fluid.

FIG. 1 illustrates an example drilling assembly 100 in which a drilling fluid 122 as disclosed above (e.g., a drilling fluid comprising a nano-cellulose and a gum) may be used. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118.

Drilling fluid 122 including a nano-cellulose and gum may be prepared. A pump 120 (e.g., a mud pump) may circulate drilling fluid 122 through a feed pipe 124 and to the kelly 110, which conveys the drilling fluid 122 downhole through the interior of the drill string 108 and through one or more orifices in the drill bit 114. The drilling fluid 122 may then be circulated back to the surface via an annulus 126 defined between the drill string 108 and the walls of the wellbore 116. At the surface, the recirculated or spent drilling fluid 122 may exit the annulus 126 and may be conveyed to one or more fluid processing unit(s) 128 via an interconnecting flow line 130. The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid.

After passing through the fluid processing unit(s) 128, a "cleaned" drilling fluid 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more of the drilling fluid additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the drilling fluid 122 at any other location in the drilling assembly 100. While FIG. 1 shows only a single retention pit 132, there could be more than one retention pit 132, such as multiple retention pits 132 in series. Moreover, the retention put 132 may be representative of one or more fluid storage facilities and/or units where the drilling fluid additives may be stored, reconditioned, and/or regulated until added to the drilling fluid 122.

Example 1

A sample fluid comprising 0.5 wt. % nano fibril cellulose (NFC) was tested using a viscometer to determine the Herschel-Bulkley parameters (to, k, n, rlo). Several tests were then conducted with varying amount of anionic gums including xanthan-gum (XG) and welan-gum (WG), non-ionic gums including guar-gum (GG) and locust bean-gum (LBG), as well as bentonite clay (bent). The results are shown in Table 1.

TABLE 1

| | Materials | $t_0$ (Pa) | K (Pa · $s^n$) | n | $\eta_0$ (Pa · s) |
|---|---|---|---|---|---|
| NFC | +0.5 NFC (control) | 0.6 | 0.04 | 0.82 | 7.1 |
| Anionic | +0.01 XG | 1.8 | 0.15 | 0.66 | 14.01 |
| | +0.5 XG | 4.6 | 0.72 | 0.49 | 30.6 |
| | +0.1 WG | 2 | 0.19 | 0.63 | 12 |
| | +0.5 WG | 3.5 | 1.27 | 0.42 | 56.3 |
| Non-Ionic | +0.1 GG | 4.2 | 0.03 | 0.88 | 49.2 |
| | +0.5 GG | 1.3 | 0.15 | 0.68 | 4.1 |
| | +0.1 LBG | 3.9 | 0.03 | 0.9 | 47.7 |
| | +0.5 LBG | 2.4 | 0.35 | 0.62 | 18.6 |
| Clay | +0.1 Bent | 3.5 | 0.13 | 0.72 | 50.8 |
| | +0.5 Bent | 2.4 | 0.35 | 0.62 | 18.6 |
| Mixed | +0.1 XG + 0.4 GG | 13.2 | 1.24 | 0.46 | 100.1 |
| | +0.25 XG + 0.25 GG | 6.3 | 0.94 | 0.49 | 40.2 |
| | +0.40 XG + 0.10 GG | 3.8 | 0.88 | 0.48 | 26.9 |

It was observed that nanofibril cellulose in combination with anionic gums XG and WG increased the viscosity and yield point with increasing concentration while non-ionic gums GG and LBG decreased viscosity and yield point with increasing concentration. Further cooperative action in the mixed system at 0.1 XG+0.4 GG leads to over double increase in tau 0 and eta 0 at the same mass balance as some of the results at the top of the table.

Example 2

Figure 3:
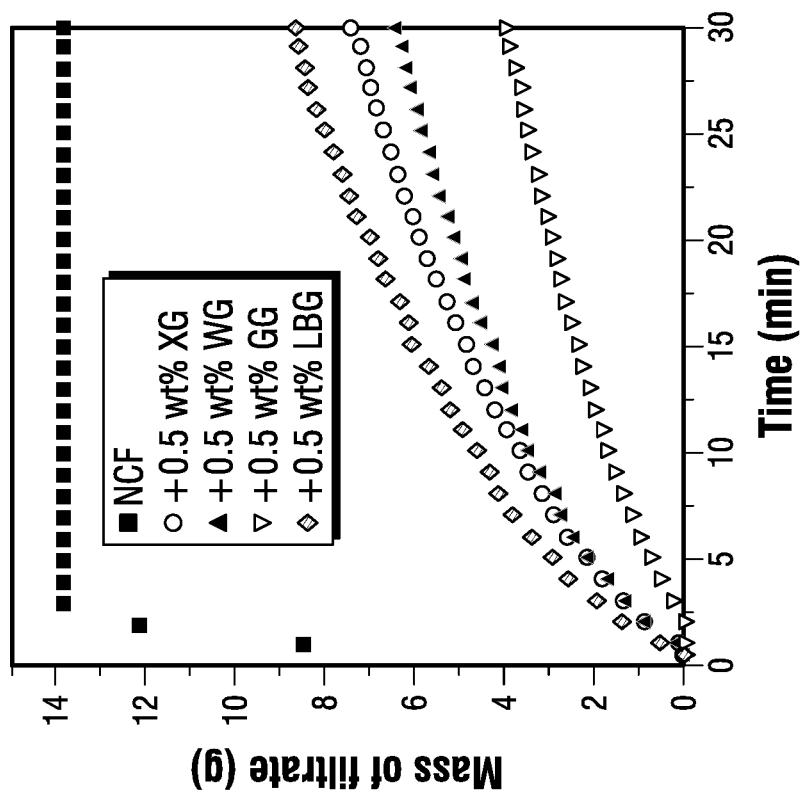
FIG. 3 is a chart of results from a fluid loss test.
Figure 2:
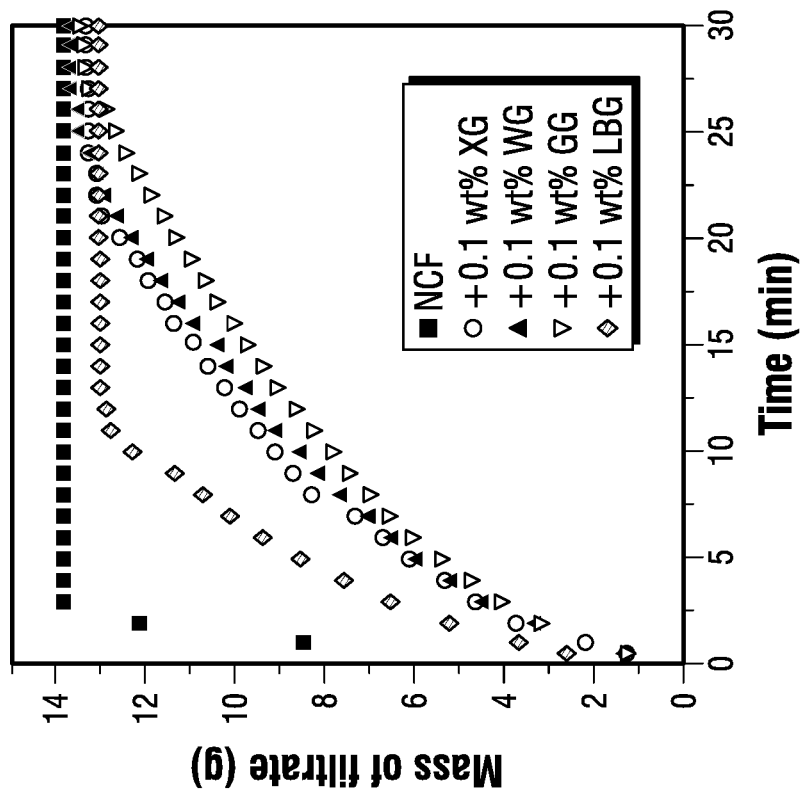
FIG. 2 is a chart of results from a fluid loss test.

A fluid sample containing 0.5 wt. % nanofibril cellulose was combined with anionic and non-ionic gum at concentrations of 0.1 wt. % and 0.5 wt. % and tested for fluid loss. The results are displayed in FIG. 2 and FIG. 3. It was observed that nanofibril cellulose combined with either anionic or non-ionic gums decreased fluid loss observed. Additionally, increasing concentration of the gums led to less fluid loss.

The exemplary treatment fluids disclosed herein may directly or indirectly affect one or more components or pieces of equipment associated with the preparation, delivery, recapture, recycling, reuse, and/or disposal of the disclosed treatment fluids. For example, the disclosed treatment fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary drilling fluids. The disclosed treatment fluids may also directly or indirectly affect any transport or delivery equipment used to convey the drilling fluids to a well site or downhole such as, for example, any transport vessels, conduits, pipelines, trucks, tubulars, and/or pipes used to compositionally move the drilling fluids from one location to another, any pumps, compressors, or motors (e.g., topside or downhole) used to drive the drilling fluids into motion, any valves or related joints used to regulate the pressure or flow rate of the treatment fluids, and any sensors (i.e., pressure and temperature), gauges, and/or combinations thereof, and the like. The disclosed treatment fluids may also directly or indirectly affect the various downhole equipment and tools that may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces. Further, the phrase at least one member selected from the group of A, B, C, and combinations thereof is intended to mean at least one A, at least one B, at least one C, or any combination thereof.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for well treatment comprising:
providing a treatment fluid wherein the treatment fluid comprises:
a base fluid;
a nano-cellulose; and
a gum; and
introducing the treatment fluid into a well bore penetrating a subterranean formation;
circulating the treatment fluid through a drill string, through a drill bit, and back above-surface through an annulus between the drill string and a wall of the well bore;
measuring a viscosity of the treatment fluid; and
adding additional gum, nano-cellulose, or both to the treatment fluid, wherein the additional gum added is anionic if the measured viscosity is below a predetermined viscosity, and wherein the additional gum added is nonionic if the measured viscosity is above the predetermined viscosity.

2. The method of claim 1, wherein the treatment fluid is a drilling fluid or a completion fluid.

3. The method of claim 1, wherein the base fluid comprises water.

4. The method of claim 1, wherein the nano-cellulose comprises at least one cellulose selected from nano-fibril cellulose, cellulose nanocrystals, and combinations thereof.

5. The method of claim 1, wherein the gum comprises at least one biopolymer selected from guar gum, locust bean gum, welan gum, xanthan gum, and combinations thereof.

6. The method of claim 1, wherein the nano-cellulose is present in a concentration in a range of from about 0.01 wt. % to about 1 wt. % based on the total weight of the treatment fluid.

7. The method of claim 1, wherein the gum is present in a concentration in a range of from about 0.01 wt. % to about 1 wt. % based on the total weight of the treatment fluid.

8. A method for adjusting a viscosity of a drilling fluid comprising:
providing the drilling fluid comprising:
water;
nano-fibril cellulose; and
a gum;
circulating the drilling fluid through a drill string, through a drill bit, and back above-surface through an annulus between the drill string and a wall of a wellbore;
measuring a viscosity of the drilling fluid;
determining an amount of additional gum to add to the drilling fluid to produce a drilling fluid with a predetermined viscosity; and
re-circulating the drilling fluid though the drill string, though the drill bit, and back above-surface though the annulus between the drill string and the wall of the wellbore.

9. The method of claim 8, wherein the gum comprises at least one biopolymer selected from guar gum, locust bean gum, welan gum, xanthan gum, and combinations thereof.

10. The method of claim 8, wherein the gum is present in a concentration in a range of from about 0.01 wt. % to about 1 wt. % based on the total weight of the drilling fluid.

11. The method of claim 8, wherein the nano-fibril cellulose is present in a concentration in a range of from about 0.01 wt. % to about 1 wt. % based on the total weight of the drilling fluid.

12. The method of claim 8, wherein the additional gum added is anionic if the measured viscosity is below the predetermined viscosity.

13. The method of claim 8, wherein the additional gum added is nonionic if the measured viscosity is above a predetermined viscosity.

14. The method of claim 8, wherein the viscosity is measured before, during, and/or after circulation of the drilling fluid.

15. The method of claim 8, wherein the additional gum is added in a mixing tank, and wherein the drilling fluid is circulated by a pump.

16. The method of claim 8, further comprising measuring filtration control properties before, during, and/or after circulation of the drilling fluid.

17. The method of claim 8, wherein the measuring the viscosity comprises measuring the viscosity of the drilling fluid after the step of circulating, wherein the gum and the additional gum are the same and each comprise at least one biopolymer selected from guar gum, locust bean gum, welan gum, xanthan gum, and combinations thereof, and wherein the drilling fluid is a water-based drilling fluid.

* * * * *